Patented Apr. 19, 1938

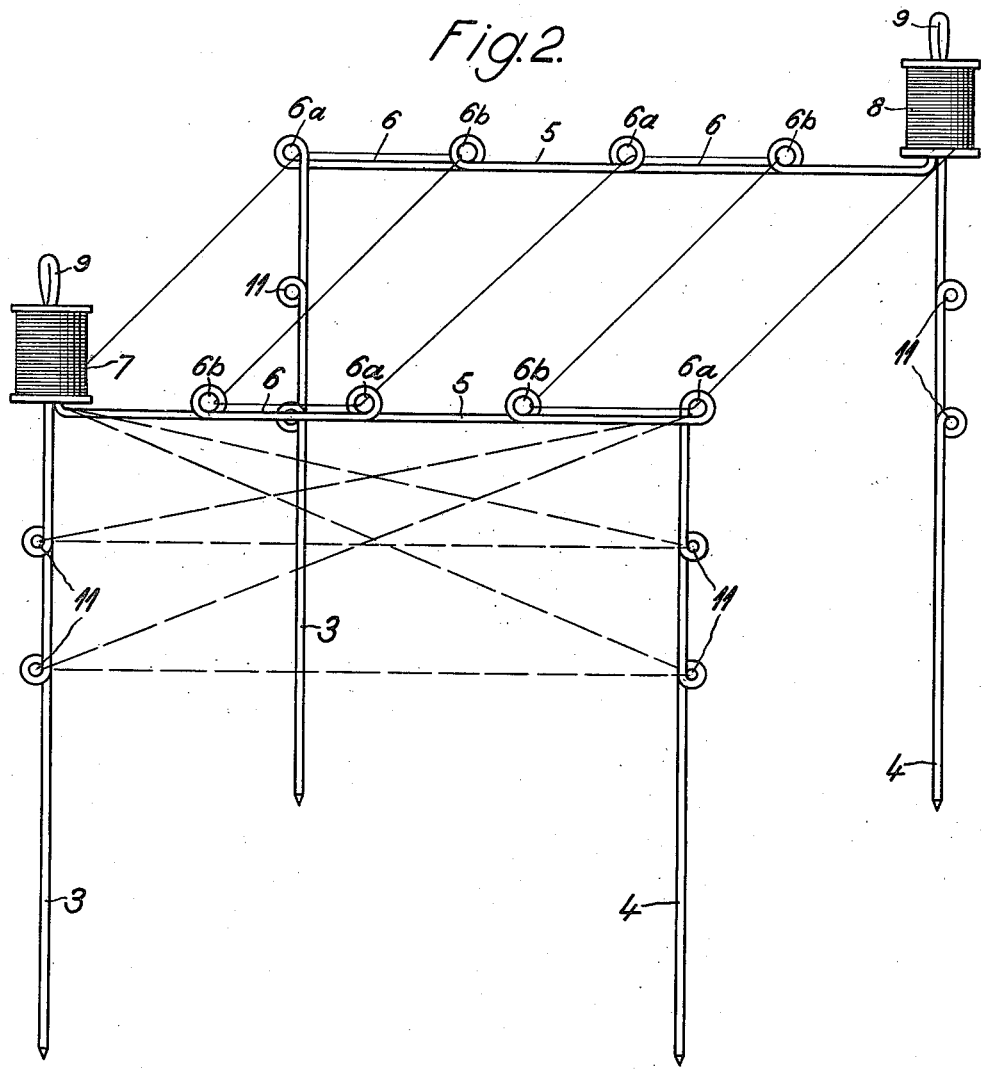

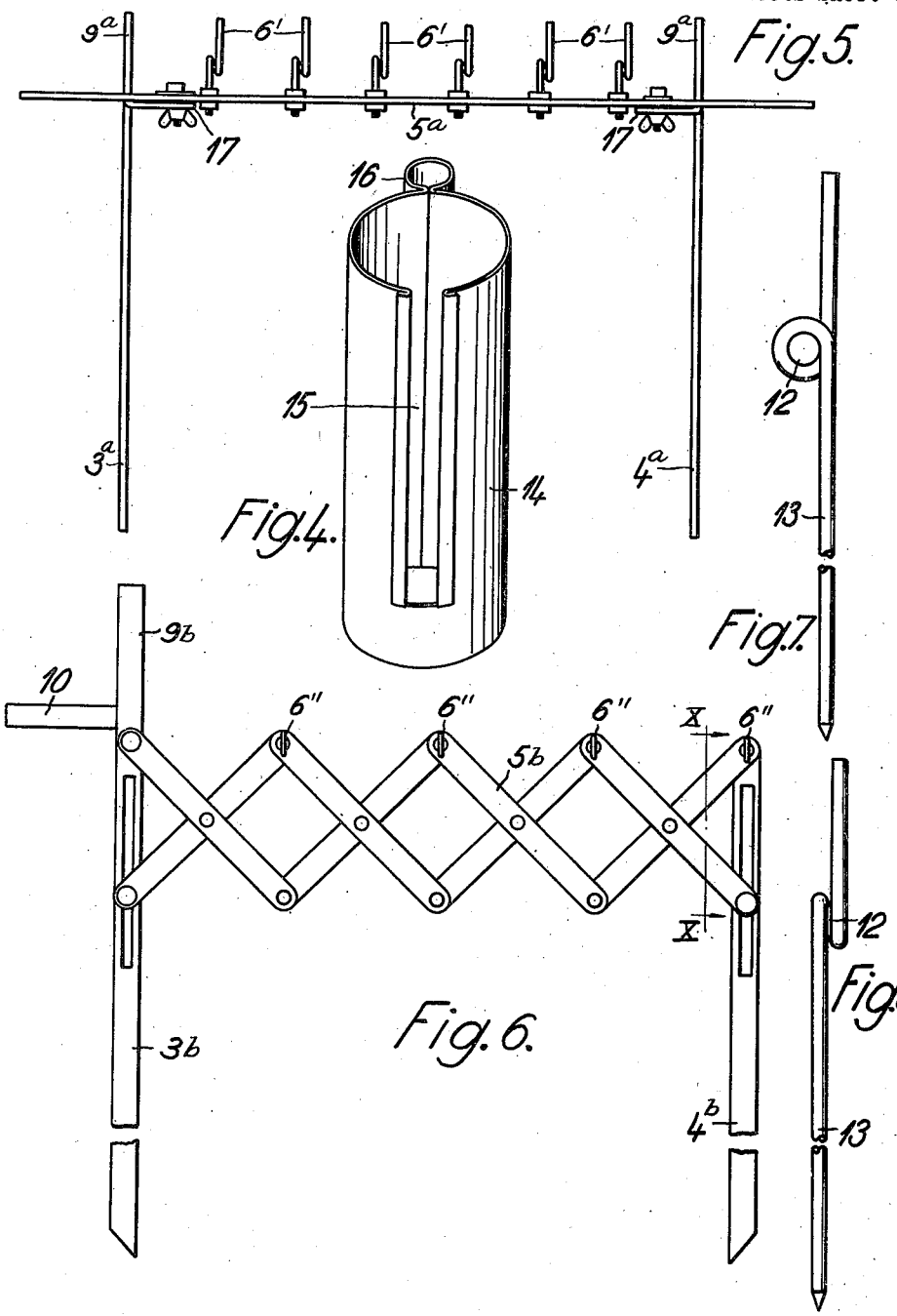

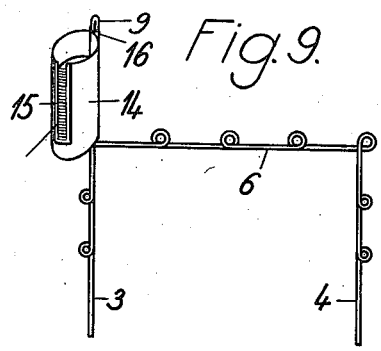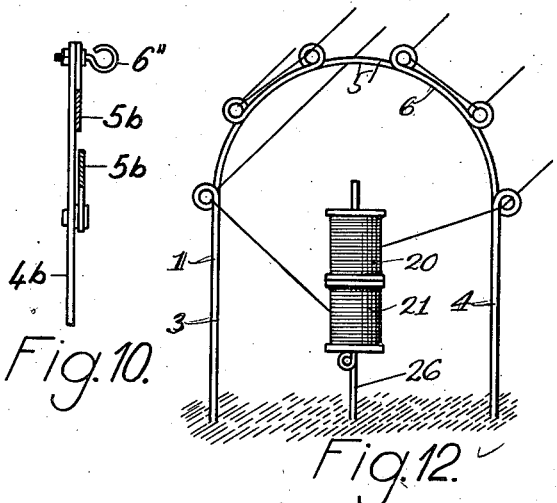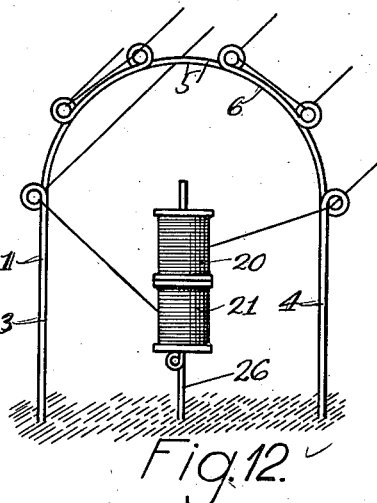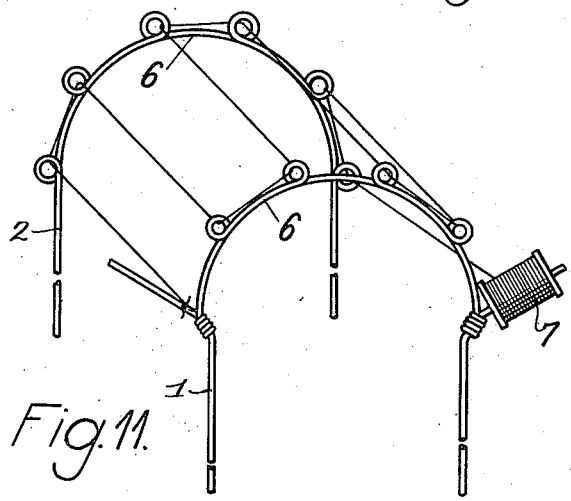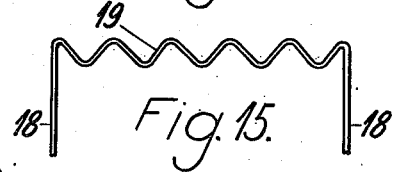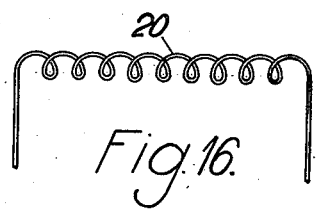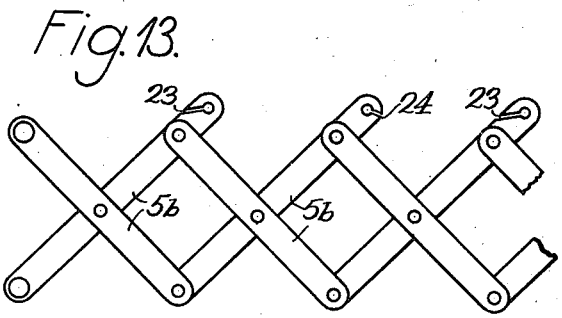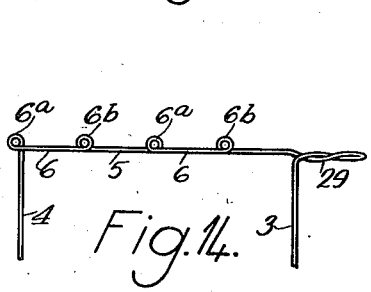

2,114,945

UNITED STATES PATENT OFFICE 2,114,945

MEANS FOR SPREADING COTTON OR THE LIKE

Roy Campbell Thomson, Chelsea, London, England

Application July 10, 1935, Serial No. 30,729
In Great Britain May 3, 1934

5 Claims. (Cl. 242—140)

This invention relates to a method and apparatus for spreading lines of cotton thread, twine, fine wire or the like over sown or planted ground and over and around bushes and trees. A principal object is to provide a deterrent to birds, but by spreading the lines in vertical formation, or in horizontal formation and then turning the formation into a vertical position, fencing can be produced. In the case of wires, they may be insulated and supplied with electric current to warm plants beneath them.

The object of the invention is to spread a plurality of lines drawn simultaneously from each source of supply such as a reel or cop. To this end the line from a source is led to and fro between a series of fixed guides and movable guides, the end then secured either to one of the guides or to a second source, and the movable guides moved as a group away from the fixed guides. For convenience in manipulation the groups of guides may be provided on frames and the invention includes convenient constructions described below.

In the accompanying drawings,

Figures 1 and 2 illustrate the invention being carried out with two slightly different forms of apparatus.

Figure 4 is a detail of an alternative form of supply holder.

Figures 5 and 6 show two alternative forms of apparatus.

Figures 7 and 8 are views at right angles of another alternative form of apparatus.

Figure 9 is a perspective view showing the device of Figure 4 in use.

Figure 10 is a detail section on the line X—X of Figure 6.

Figure 11 illustrates the invention being carried out with a single source of supply.

Figure 12 is a detail showing a pair of supplies mounted on a single separate support.

Figure 13 shows a detail modification of Figure 6.

Figure 14 shows a slightly modified form of the frames shown in Figure 2 and

Figures 15 and 16 show two forms of intermediate support which may be used in the practice of the invention.

Figure 1:
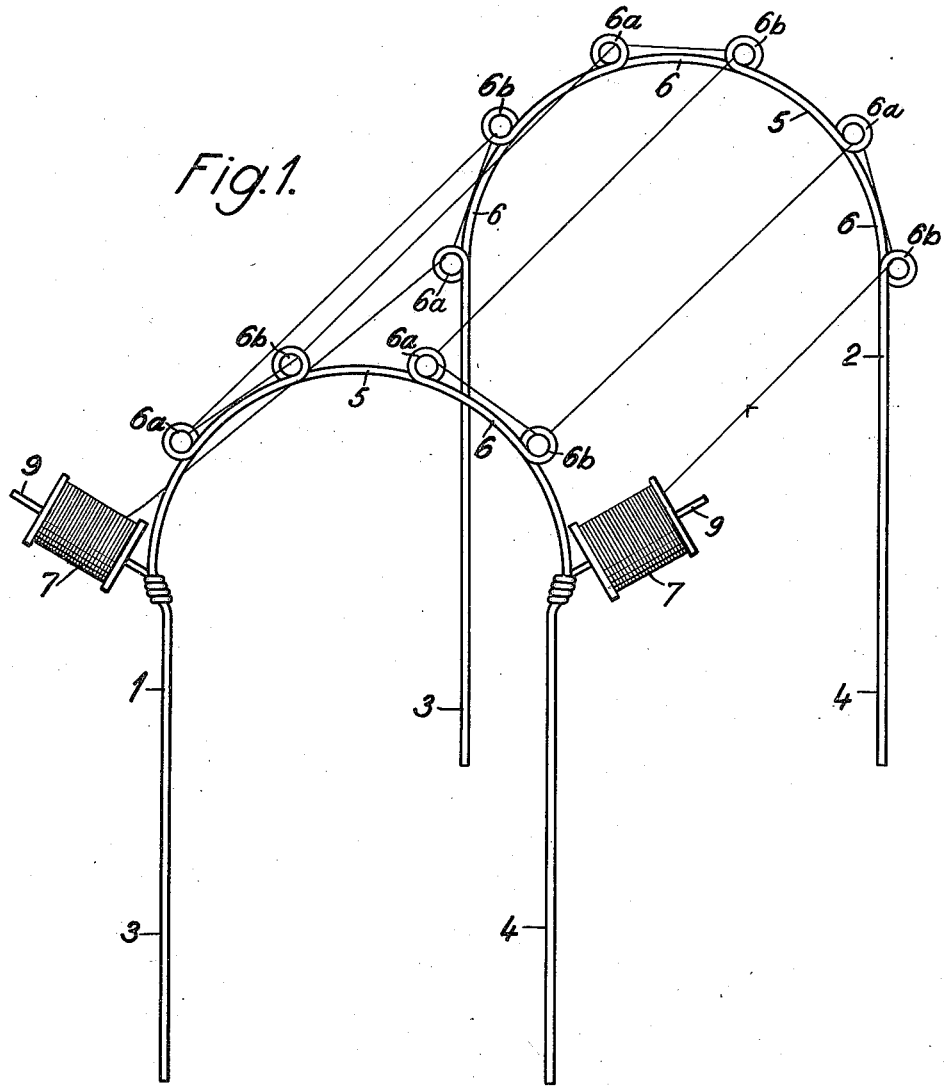

As shown in Figures 1 and 2 the apparatus employed comprises a pair of similar frames 1, 2 each consisting of a pair of legs 3, 4 adapted to be thrust into the ground, joined by a cross member 5 provided with a plurality of guides 6. The frames are completed by supports for two supplies 7, 8 of cotton thread, twine, fine wire or the like.

To carry the method of the invention into practice, one frame say 1, is fixed in the ground for instance at one end of a row of plants, the cotton thread or the like from one supply say 7 led and carried to and fro in a zig zag or rectangular hairpin formation around the guides 6 and the end then secured to the second supply 8. The operator now carries frame 2 away from frame 1 to the other end of the row, the cotton thread or the like paying out from both supplies (at more or less equal rates since the resistances to be overcome by each will be more or less equal) and fixes frame 2 into the ground. It will be observed that a plurality of lines of cotton thread has been spread in a single operation from two sources only.

In Figure 1 the total number of lines is even and accordingly the supplies 7 and 8 are both on the same frame. In Figure 2, an uneven number is used and accordingly one supply is carried on each frame and as explained in greater detail below the two frames can be identical.

It is also possible, as shown for example in Figure 11, to use only one supply in which case the end from one supply 7, after being carried round the guides 6 is fastened to the frame, in the present example frame 1. Then as one frame is moved away from the other, the whole of the lines is drawn from the one supply.

A further possibility is to carry the supply or supplies on a separate member thrust into the ground, for example a member similar to that described below with respect to Figures 7 and 8. If the frames are arranged as in Figure 1 to deal with an even number of lines, then as shown in Figure 12, only a single separate member 26 carrying both supplies 20, 21, one riding on top of the other, need be used.

The number of lines which can be drawn from each supply will depend on various factors among these being the strength of the cotton thread or the like and the friction round the guides 6. Clearly two supplies as in Figures 1 and 2 will enable more lines to be spread simultaneously than one as described in the preceding paragraph. If it is desired to spread still more lines simultaneously, frames with a larger number of guides can be used and supplies provided at suitable intervals, each two being connected up as in Figure 1 or 2; in other words several sets of lines will be spread in parallel.

Figure 3:
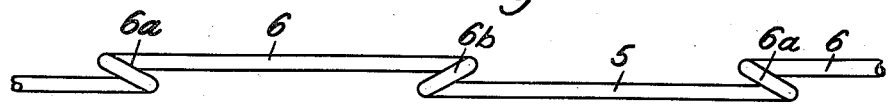
Figure 3 is a detail plan of part of Figure 1 or 2.

The invention is in no way limited to the use of any particular construction of apparatus, though that illustrated is a convenient form which can readily be made of bent wire. To keep the lines parallel as is generally desirable, the guides 6 are of equal width to the spaces between them. A particularly convenient form of guide is formed by bending the wire into a pair of opposite handed eyes 6a, 6b one at each end of the guide, the eyes not being quite closed in plan so that the line can be threaded in without threading through as indicated in Figure 3 and when once threaded cannot slip out if left slack.

The pairs of frames are relatively arranged so that the guides on one come opposite the spaces between the guides on the other. The arrangement of Figure 2 shows that this is automatically obtainable with a pair of identical frames having an equal number of guides and spaces and providing for an odd number of lines.

The frames may be provided with pivots 9 or 29 for supplies in the form of reels or cops wound on paper tubes.

In Figure 1 the pivot 9 is formed by twisting on a piece of wire, while in Figure 2 the pivot 29 is formed by a hairpin bend, which may also be twisted. Instead the supplies may be carried in containers having an aperture or slot for the emergence of the line; this enables supplies with or without a central bore to be used. A particularly convenient form is shown in Figure 4. This comprises a cylindrical container 14 open at the top for ready insertion of the supply, with an axial slot 15 also reaching to the top, for guiding the emerging cotton thread or the like. A sleeve 16 is secured to the opposite side to the slot by which the container can be readily mounted on a spindle such as 9 as shown in Figure 9.

As shown in Figure 1 the frames may have an arched cross member 5; this form is suitable for use with rows of plants such as strawberries. Figure 2 shows a frame with a straight cross-member 5; this form is suitable for use where several are to be arranged side by side, to cover a broad area. Further eyelets or guides such as 11 may be provided for carrying cotton thread or the like across the frame to close the end of the protected area.

Figure 5 shows another convenient form of frame. Here the cross piece 5a joining the legs 3a, 4a is of wood and carries guides 6' similar to those described below with reference to Figures 7 and 8. Instead the guides may be in the form of screw eyes opened sufficiently to enable the cotton thread to be threaded in without threading through. The legs are plain rods with a hairpin loop 17 formed at right angles on which the cross piece rests and they may be attached thereto by a screw passing between the legs of the hairpin. Instead the upper ends of the legs could be threaded and the cross member held by nuts. The upper ends of the legs 3a, 4a conveniently form the spindles 9a.

The lines can readily be spaced at less than the spacing of the guides 6 in Figures 1, 2 and 5 by setting the frames at an angle to the direction of the lines of cotton thread or the like. Figures 6 and 10 show another form of frame in which the cross member 5b joining the legs 3b, 4b is in the form of a lazy-tongs structure which enables the spacing of the lines to be adjusted and the frame to be closed up when out of use. One leg 3b is extended upwardly to form a spindle 9b for the supply of cotton thread and has a projection 10 forming a support therefor. Conveniently the guides are formed by the use of screw eyes 6'' which also form the upper pivots of the lazy-tongs structure, the eyes being opened sufficiently to enable the line to be threaded in without threading through. Alternatively, as shown in Figure 13, the members 5b of the lazy-tongs structure may be slotted at 23, 24 to form the guides.

The method of the invention can also be carried into practice without using frames at all, the guides being formed by successive pairs of adjacent single rods thrust into the ground and having suitable eyelets or the like formed at the top. For the operation of spreading, one set of rods will be temporarily attached to a plank or the like provided with sockets, eyes or other devices to receive the rods. As shown in Figures 7 and 8 the eyes 12 on the separate rods 13 are shaped to enable the line to be threaded in without threading through and yet prevent the line from slipping out unintentionally. The upper ends of some or all the rods 13 can be made long enough to form spindles for receiving the supplies.

It will be understood that the method of the invention can also be applied to the spreading of lines around or over bushes and trees as well as over relatively flat pieces of ground. Where the frames have to be moved vertically, it will be desirable to provide horizontal spindles for the supplies in the case of reels or cops on tubes, to enable the cotton thread or the like to run off readily. Figure 14 shows a frame similar to those in Figure 2 so provided with horizontal spindles, the same parts bearing the same references as in Figure 2.

In the case of very long spreads intermediate supports such as shown in Figures 15 and 16 may be desirable to prevent sagging or blowing about of the cotton thread. Such supports can take the form of a pair of wire rods 18 to be thrust into the ground, joined by a corrugated wire 19, Figure 15, or helical wire 20, Figure 16, with fairly open turns in which the cotton thread or the like will lodge.

What I claim is:—

1. Apparatus for use in spreading simultaneously a plurality of lines of cotton thread, twine, fine wire or the like, comprising two frames of bent wire each comprising a pair of legs, a cross member joining said pair of legs, and a plurality of guides each consisting of two laterally spaced eyes one right handed and one left handed and both not quite closed formed in each said cross member.

2. In apparatus for use in spreading lines of cotton thread, twine, thin wire, or the like, a plurality of rigidly associated guides, each consisting of two spaced coplanar wire eyes, one right handed and one left handed and both not quite closed and means for supporting said guides so that the right handed eye of one guide is adjacent the left handed eye of the next.

3. A frame for use in spreading lines of cotton thread, twine, thin wire or the like, comprising a pair of legs adapted to be thrust into the ground, a wire cross member joining said legs, a plurality of guides each consisting of two laterally spaced eyes one right handed and one left handed and both not quite closed, formed in said cross member, and a spindle for supporting a supply of cotton thread or the like rigid with the frame at the junction of one of said legs with said cross member.

4. A frame for use in spreading lines of cotton thread, twine, thin wire or the like, comprising a pair of legs adapted to be thrust into the ground, a cross member joining said legs, a plurality of guides each consisting of two laterally spaced eyes one right handed and one left handed and both not quite closed, on said cross member, and a spindle at the junction of one of said legs with said cross member, the whole being formed of a single length of wire and said spindle being formed by a doubled, twisted portion of the wire.

5. A frame for use in spreading lines of cotton thread, twine, thin wire or the like, comprising a pair of legs adapted to be thrust into the ground, a cross member supported by said legs, a plurality of eyes on said cross member alternately right and left handed and not quite closed, and a spindle for supporting a supply of cotton thread or the like carried by the frame.

ROY CAMPBELL THOMSON.